US009288774B2

(12) United States Patent
Sun et al.

(10) Patent No.: US 9,288,774 B2
(45) Date of Patent: Mar. 15, 2016

(54) COMMUNICATIONS APPARATUSES AND METHOD FOR MULTI-LEVEL TRANSMISSION POWER CONTROL THEREOF

(75) Inventors: Juei-Ting Sun, Kaohsiung (TW); Po-Chun Huang, Hsinchu (TW); Wei-Kun Su, Taipei (TW); Shuo-Jen Hsu, Hsinchu (TW); Yuan Chen, Hsinchu (TW); Tzu-Wei Han, New Taipei (TW); Hsuan-An Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 392 days.

(21) Appl. No.: 13/272,835

(22) Filed: Oct. 13, 2011

(65) Prior Publication Data

US 2013/0094491 A1    Apr. 18, 2013

(51) Int. Cl.
*H04W 52/04*  (2009.01)
*H04W 52/38*  (2009.01)
*H04W 52/28*  (2009.01)
*H04W 52/36*  (2009.01)
*H04W 52/50*  (2009.01)

(52) U.S. Cl.
CPC .......... *H04W 52/383* (2013.01); *H04W 52/286* (2013.01); *H04W 52/367* (2013.01); *H04W 52/50* (2013.01)

(58) Field of Classification Search
CPC ..................................................... H04W 52/04
USPC .................. 370/345, 318; 455/450, 13.4, 522
See application file for complete search history.

(56) References Cited

U.S. PATENT DOCUMENTS

| | | | |
|---|---|---|---|
| 2003/0100269 A1* | 5/2003 | Lehtinen et al. | 455/69 |
| 2003/0207695 A1* | 11/2003 | Chang et al. | 455/522 |
| 2006/0142034 A1* | 6/2006 | Wentink et al. | 455/515 |
| 2009/0017829 A1* | 1/2009 | Laroia et al. | 455/446 |
| 2009/0147756 A1 | 6/2009 | Yang et al. | |
| 2011/0007702 A1* | 1/2011 | Chin et al. | 370/329 |
| 2011/0021142 A1 | 1/2011 | Desai et al. | |
| 2011/0263214 A1* | 10/2011 | Robinson et al. | 455/88 |
| 2012/0003932 A1* | 1/2012 | Zhodzishsky | 455/41.2 |

FOREIGN PATENT DOCUMENTS

CN          101640929          2/2010

\* cited by examiner

*Primary Examiner* — Ian N Moore
*Assistant Examiner* — Mewale Ambaye
(74) *Attorney, Agent, or Firm* — McClure, Qualey & Rodack, LLP (57) ABSTRACT

A communications apparatus is provided. A radio module transmits first packets before establishing a connection with a peer communications device. A transmission power utilized for transmitting the first packets is adjustable, so that multiple levels of transmission power are utilized for transmitting the first packets.

11 Claims, 8 Drawing Sheets

COMMUNICATIONS APPARATUSES AND METHOD FOR MULTI-LEVEL TRANSMISSION POWER CONTROL THEREOF

BACKGROUND OF THE INVENTION

1. Field of the Invention

The invention relates to a method for transmission power control, and more particularly to a method for multi-level transmission power control of a communications apparatus.

2. Description of the Related Art

Bluetooth is a low-power, short-range wireless networking standard designed for local area voice and data transfer. Bluetooth radios operate in the unlicensed ISM band at 2.4 GHz with a set of 79 hop carriers with 1 MHz spacing. A master-slave communication model with a frequency hopping spread spectrum (FHSS) transmission technique is adopted in the Bluetooth specification to ensure protection from interference and security of data. A collection of Bluetooth devices may be connected in an Ad Hoc fashion. The Bluetooth devices may connect to each other to form a network known as a piconet. One Bluetooth device may act as a master device for the piconet, while the other devices may concurrently operate as slave devices. At the maximum, 8 active Bluetooth devices may participate in the one piconet. Time may be divided into slots of 625 μs in the piconet. The master and slaves may alternate transmission opportunities in a time-division duplex (TDD) fashion. The master controls the formation of the Bluetooth communication links and communication procedures with the slaves within the piconet. A slave may be enabled for transmission, only after being polled by the master.

Bluetooth low energy (BLE) is a low power Bluetooth protocol for small, battery-powered devices, such as watches, wireless keyboards, gaming and sports sensors, or other manner. Devices using Bluetooth low energy wireless technology are expected to consume a fraction of the power of classic Bluetooth enabled products.

In order to further save transmission power, a method for multi-level transmission power control, which is applicable to both the Bluetooth and Bluetooth low energy technology and even other wireless communication technologies such as IEEE 802.11 is required.

BRIEF SUMMARY OF THE INVENTION

Communications apparatuses and methods for multi-level transmission power control thereof are provided. An embodiment of a communications apparatus comprises a radio module. The radio module transmits a plurality of first packets before establishing a connection with a peer communications device. A transmission power utilized for transmitting the first packets is adjustable, so that multiple levels of transmission power are utilized for transmitting the first packets.

An embodiment of a method for multi-level transmission power control of a communications apparatus comprises: generating a power control signal to control transmission power utilized for transmitting a plurality of first packets; and in response to the power control signal, using multiple levels of transmission power to transmit the first packets, wherein the first packets are transmitted for searching for or paging a peer communications device or broadcasting advertisements of the communications apparatus.

Another embodiment of a communications apparatus transmits at least one first packet for searching for a peer communications device, and transmits at least one second packet for setting up a connection with the peer communications device, wherein a transmission power of the first packet is less than a transmission power of the second packet.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
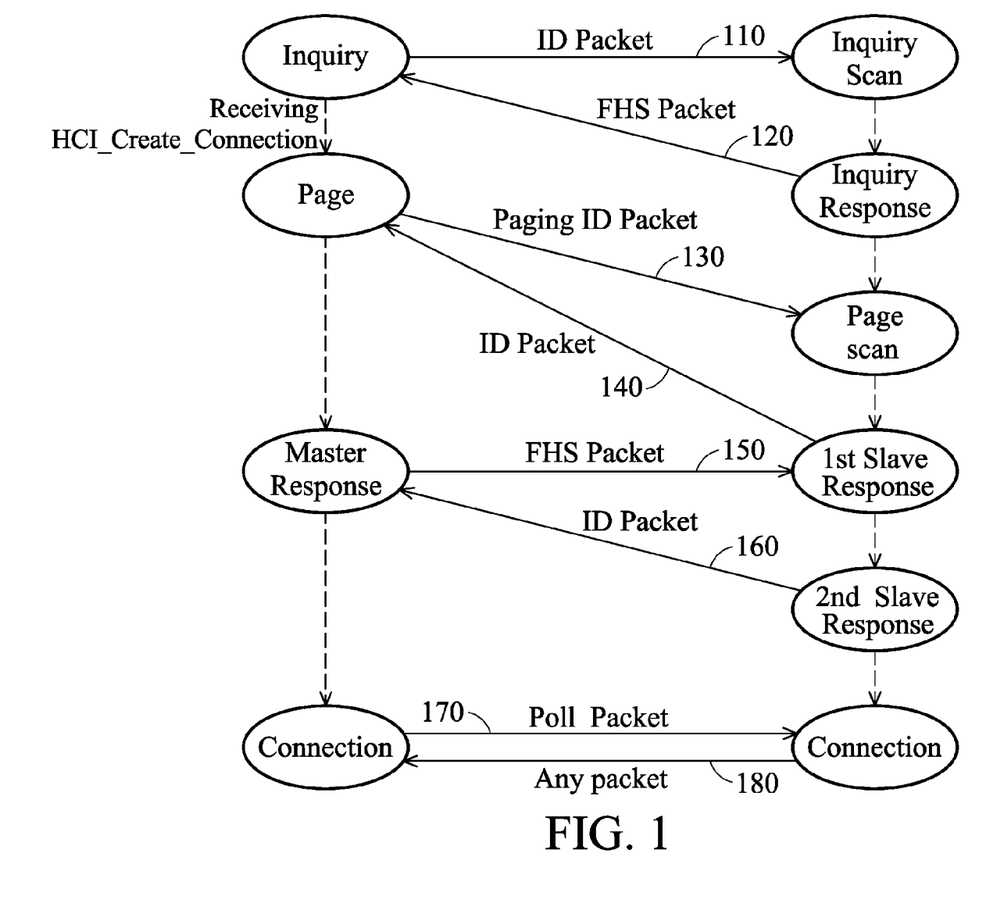
FIG. 1 shows a state machine diagram maintained by a Bluetooth master device and a Bluetooth slave device in an inquiry procedure and a paging procedure according to an embodiment of the invention.

FIG. 1 shows a state machine diagram maintained by a Bluetooth master device and a Bluetooth slave device in an inquiry procedure and a paging procedure according to an embodiment of the invention. The master device may first be in an inquiry state and broadcast one or more ID packet(s) 110 to find surrounding devices. The slave device may be in an inquiry scan state to scan the broadcast ID packet(s). When an ID packet has been received, the slave device may enter an inquiry response state and transmit an FHS packet 120 to the master device, where the FHS stands for Frequency Hop Synchronization. Upon receiving the FHS packet 120, the master device may enter a page state when receiving HCI_Create_Connection command from host and begin to transmit one or more paging ID packet(s) 130 to page the slave device. The slave device may enter a page scan state to scan the paging ID packet(s) 130.

When a paging ID packet has been received, the slave device may enter a slave response state and respond with the ID packet 140 to the master device. The master device may also enter a master response state and transmit an FHS packet 150 to the slave device. Then, the slave device may respond with the ID packet 160. After that, both the slave device and the master device may enter a connection state. The Poll packet 170 may be transmitted from master device and the slave device may respond with any type of packet 180. Finally, an ACL connection is established, where ACL stands for Asynchronous Connection-Oriented Link.

Figure 2A:
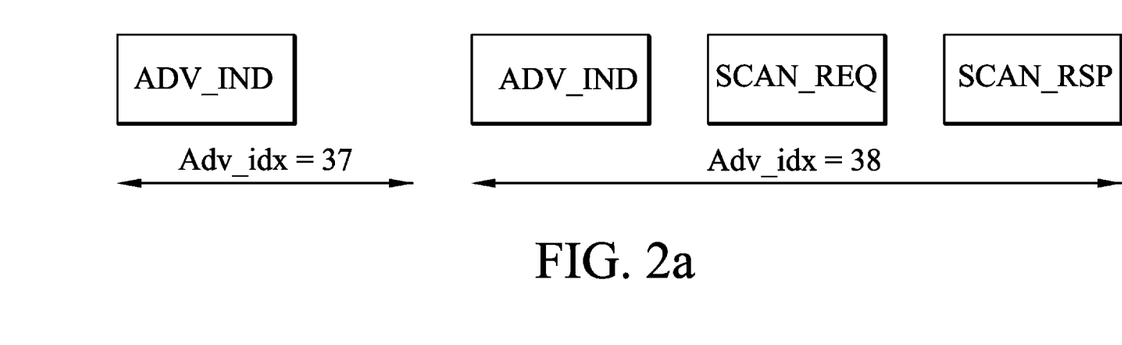
FIG. 2a shows a message flow diagram in an advertising procedure of Bluetooth low energy devices according to an embodiment of the invention.
Figure 2B:
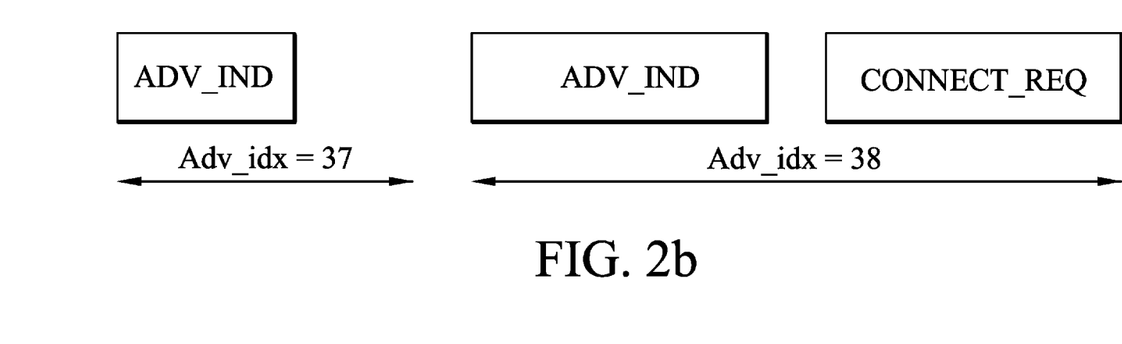
FIG. 2b shows a message flow diagram in a connection establishment procedure of Bluetooth low energy devices according to an embodiment of the invention.

FIG. 2a shows a message flow diagram in an advertising procedure of Bluetooth low energy devices according to an embodiment of the invention. According to the Bluetooth low energy standard, an advertiser may broadcast a plurality of advertising packets ADV_IND carrying information pertinent to the advertiser with different indices ADV_idx in air. Once a scanner has scanned an advertising packet ADV_IND, a scan request packet SCAN_REQ may be sent to the advertiser. The advertiser may respond with a scan response packet SCAN_RSP to the scanner in response to the scan request packet SCAN_REQ. The scanner may act as an initiator to initiate a connection establishment procedure to establish a BLE connection when receiving HCI_LE_Create_Connection command from host. FIG. 2b shows a message flow diagram in a connection establishment procedure according to an embodiment of the invention. The initiator may transmit a connection request packet CONNECT_REQ to the advertiser to establish a BLE connection. After receiving the connection request packet CONNECT_REQ, the BLE connection may be established between the advertiser and the initiator, and the advertiser may become a slave device.

Note that conventionally, there is no power control mechanism applied in the above-mentioned procedures. Therefore, the master device may always use the maximum transmission power to transmit the ID packets in the inquiry procedure and the paging procedure, and the advertiser may always use the maximum transmission power to transmit the advertising packets in the advertising procedure. The maximum transmission power is defined by corresponding standards. However, when the target device to be found or paged is close to the master device or the advertiser, the current and power consumption of the Bluetooth or Bluetooth low energy device is high due to the repeated use of the maximum transmission power, thus wasting battery power. Therefore, a method for multi-level transmission power control, which is applicable to both the Bluetooth and Bluetooth low energy protocols and even other wireless communication technologies such as IEEE 802.11, is proposed in the application.

Figure 3:
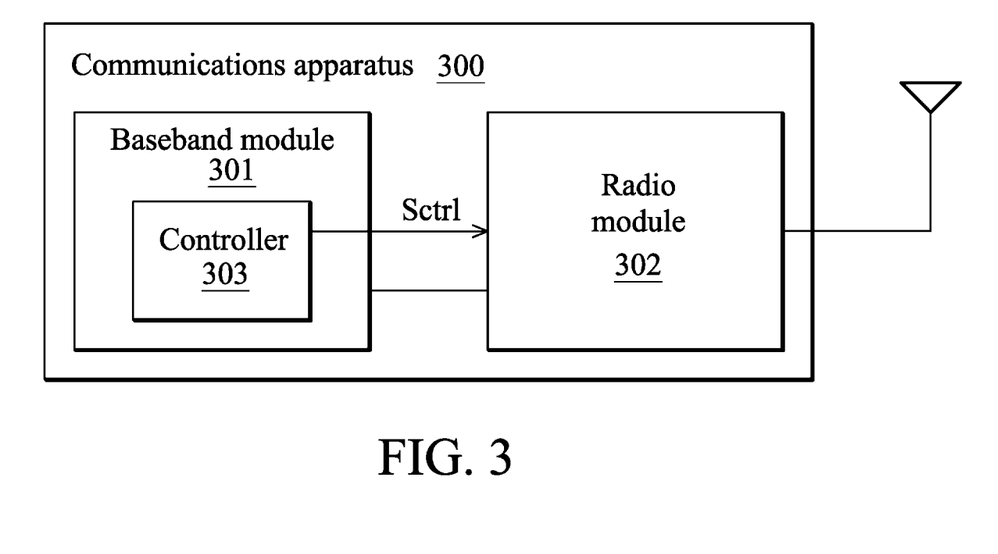
FIG. 3 shows a simplified block diagram of a communications apparatus according to an embodiment of the invention.

FIG. 3 shows a simplified block diagram of a communications apparatus according to an embodiment of the invention. The communications apparatus 300 may comprise at least a baseband module 301 and a radio module 302. The radio module 302 is arranged to perform the functionality of wireless transmissions and receptions between one or more peer communications devices. To further clarify, the radio module 302 may comprise at least a power amplifier (not shown) and a Radio Frequency (RF) unit (not shown). The RF unit may receive RF wireless signals, convert the received RF wireless signals to baseband signals, which are processed by the baseband module 301, or receive baseband signals from the baseband module 301 and convert the received baseband signals to RF wireless signals, which are later transmitted. The RF unit may comprise multiple hardware devices to perform radio frequency conversion. For example, the RF unit may comprise a mixer to multiply the baseband signals with a carrier oscillated in a desired radio frequency, depending on the radio access technology (RAT) in use. The power amplifier is utilized for amplifying transmission power of the RF wireless signals to be transmitted.

The baseband module 301 may comprise a controller 303 for controlling the operations of the communications apparatus 300. The baseband module 301 may also comprise multiple hardware devices to perform baseband signal processing, including Analog to Digital Conversion (ADC)/Digital to Analog Conversion (DAC), gain adjusting, modulation/demodulation, encoding/decoding, and so on.

According to an embodiment of the invention, before establishing a connection with a peer communications device, the radio module 302 may transmit a plurality of packets for searching for or paging a peer communications device, or broadcasting advertisements of the communications apparatus 300. In one embodiment of the invention, according to the Bluetooth standard, the packets may be an inquiry packet or the identity packets transmitted during the inquiry procedure, such as the ID packets 110 as shown in FIG. 1. In another embodiment of the invention, the packets may be a paging packet or the identity packets transmitted during the paging procedure, such as the paging ID packets 130 as shown in FIG. 1. In yet another embodiment of the invention, according to the Bluetooth low energy standard, the packets may be the identity packets transmitted during the advertising procedure, such as the ADV_IND packets as shown in FIG. 2a.

According to the embodiment of the invention, the controller 303 may generate a power control signal Sctrl to dynamically control the transmission power of the packets transmitted for searching for or paging the peer communications device, or broadcasting advertisements of the communications apparatus 300. The radio module 302 (for example, the power amplifier) may adjust the transmission power utilized for transmitting the packets in response to the power control signal Sctrl. Therefore, multiple levels of transmission power may be utilized for transmitting the packets before an Asynchronous Connection-Oriented Link (ACL) or a Bluetooth low energy connection is established.

Figure 4A:
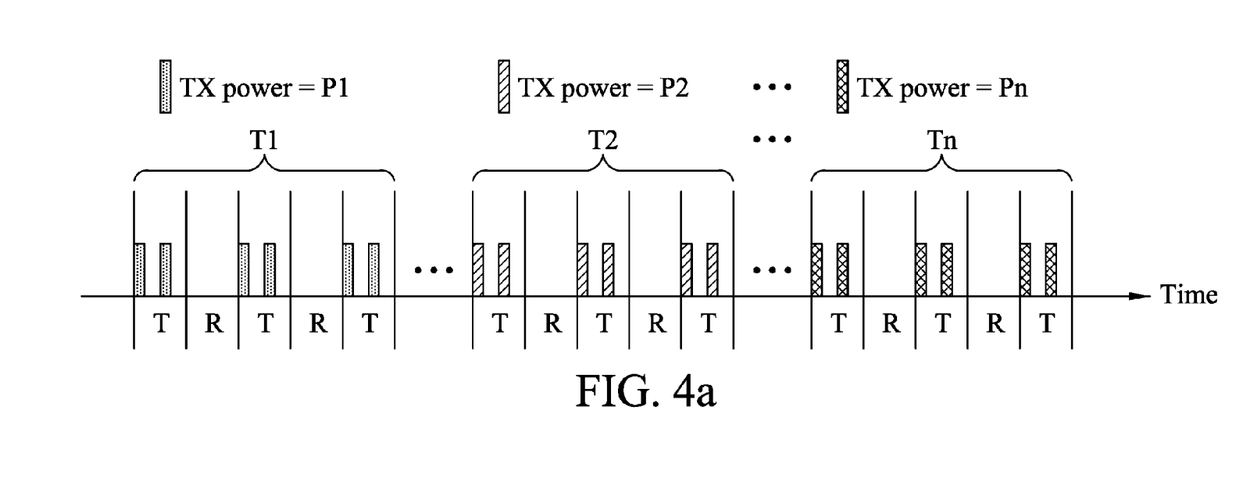
FIG. 4a shows an inquiry or paging ID packet transmitting and receiving schedule along a time axis according to an embodiment of the invention.

FIG. 4a shows an inquiry or paging ID packet transmitting and receiving schedule of a master device along a time axis according to an embodiment of the invention. As shown in FIG. 4a, each T and R represents a time slot, where T stands for the time slot scheduled for transmitting packets and R stands for the time slot scheduled for receiving packets. In the embodiment, the radio module 302 may use different levels of transmission power to transmit the packets at different periods. As shown in FIG. 4a, the transmission power (i.e. TX power) P1 is used in a first predetermined period T1, the transmission power P2 is used in a second predetermined period T2, and the transmission power Pn is used in an n-th predetermined period Tn. Note that the transmission power P1, P2 . . . Pn may be randomly adjusted, or adjusted in an ascending or descending manner, or other manner. The invention should not be limited to any specific adjusting algorithm.

Figure 4B:
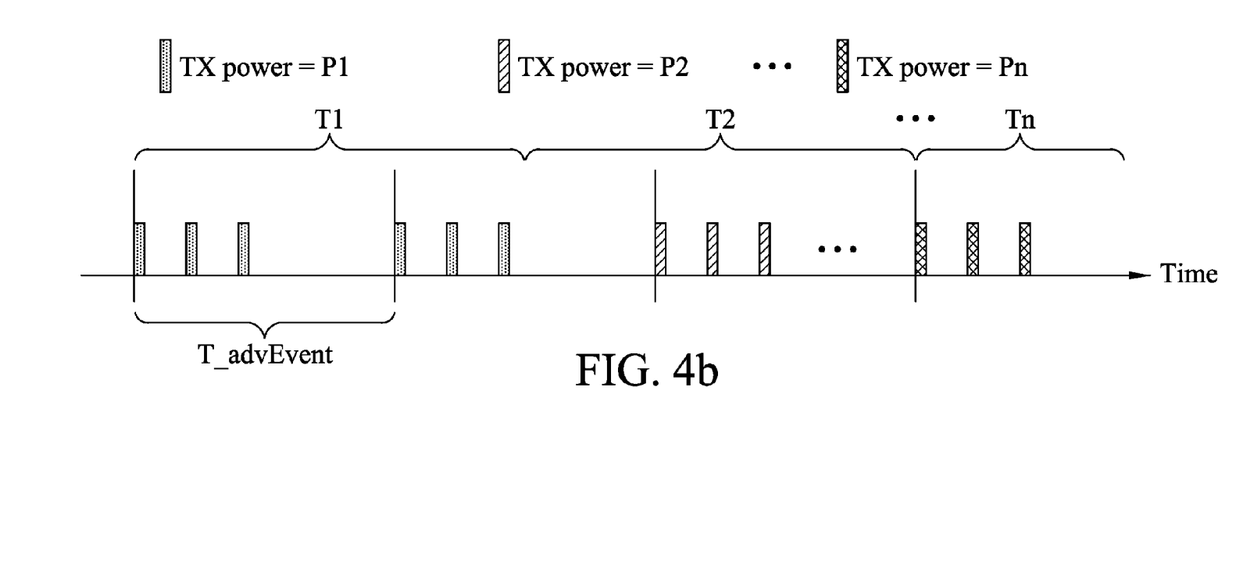
FIG. 4b shows an advertising packet transmitting schedule along a time axis according to an embodiment of the invention.

FIG. 4b shows an advertising packet transmitting schedule along a time axis according to an embodiment of the invention. In the embodiment, the radio module 302 may use different levels of transmission power to transmit the advertising packets at different periods. As shown in FIG. 4b, the transmission power P1 is used in a first predetermined period T1, the transmission power P2 is used in a second predetermined period T2, and the transmission power Pn is used in an n-th predetermined period Tn. Note that the transmission power P1, P2 . . . Pn may be randomly adjusted, or adjusted in an ascending or descending manner, or other manner. The invention should not be limited to any specific adjusting algorithm.

Figure 5A:
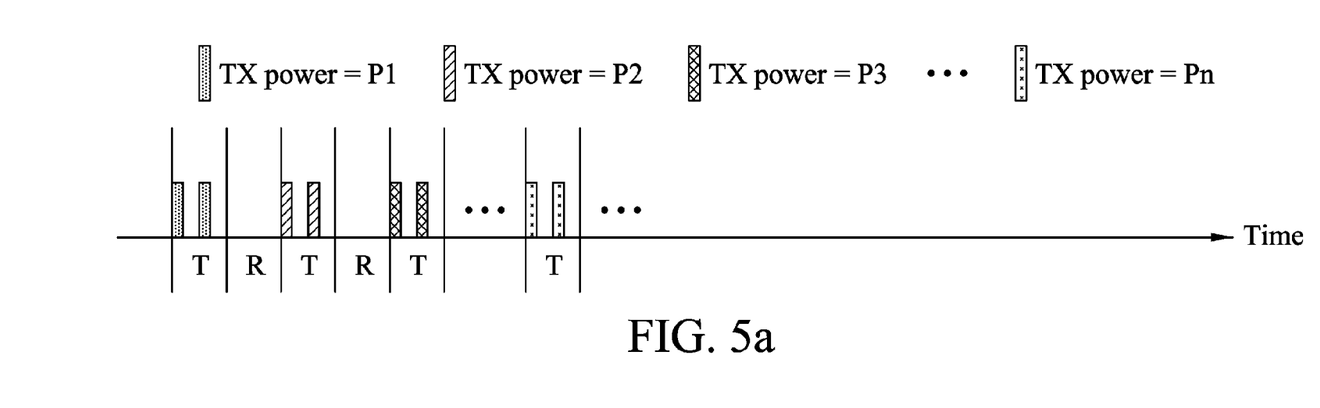
FIG. 5a shows an inquiry or paging ID packet transmitting and receiving schedule along a time axis according to another embodiment of the invention.

FIG. 5a shows an inquiry or paging ID packet transmitting and receiving schedule of a master device along a time axis according to another embodiment of the invention. In the embodiment, the radio module 302 may use different levels of transmission power to transmit the packets in different time slot. As shown in FIG. 5a, the transmission power P1 is used in the first transmitting time slot, the transmission power P2 is used in the second transmitting time slot, the transmission power P3 is used in the third transmitting time slot, and the transmission power Pn is used in the n-th transmitting time slot. Note that the transmission power P1, P2, P3 . . . Pn may be randomly adjusted, or adjusted in an ascending or descending manner, or other manner. The invention should not be limited to any specific adjusting algorithm. Note also that according to yet another embodiment of the invention, the radio module 302 may also use different levels of transmission power to transmit different packets. For example, the radio module 302 may use different transmission power to transmit the two packets in the first, second, or n-th time slot.

Figure 5B:
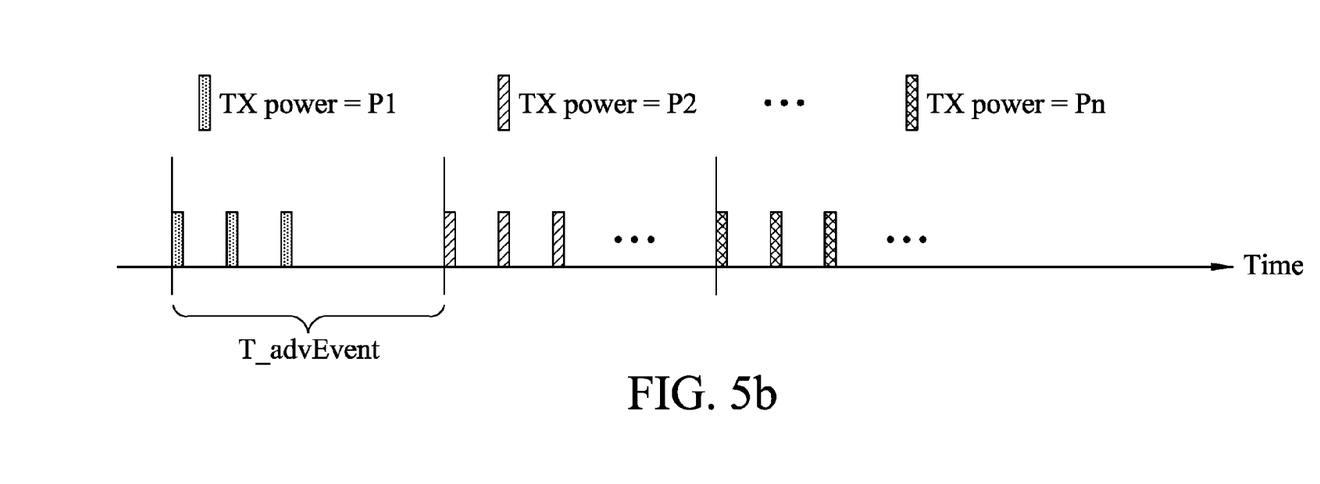
FIG. 5b shows an advertising packet transmitting schedule along a time axis according to another embodiment of the invention.

FIG. 5b shows an advertising packet transmitting schedule along a time axis according to another embodiment of the invention. As shown in FIG. 5b, there are three advertising packets transmitted in an advertising event time interval T_advEvent. In the embodiment, the radio module 302 may use different levels of transmission power to transmit the advertising packets in different advertising event time intervals T_advEvent. As shown in FIG. 5b, the transmission power P1 is used in the first time interval T_advEvent, the transmission power P2 is used in the second time interval T_advEvent, and the transmission power Pn is used in the n-th time interval T_advEvent. Note that the transmission power P1, P2, . . . Pn may be randomly adjusted, or adjusted in an ascending or descending manner, or other manner. The invention should not be limited to any specific adjusting algorithm.

Figure 5C:
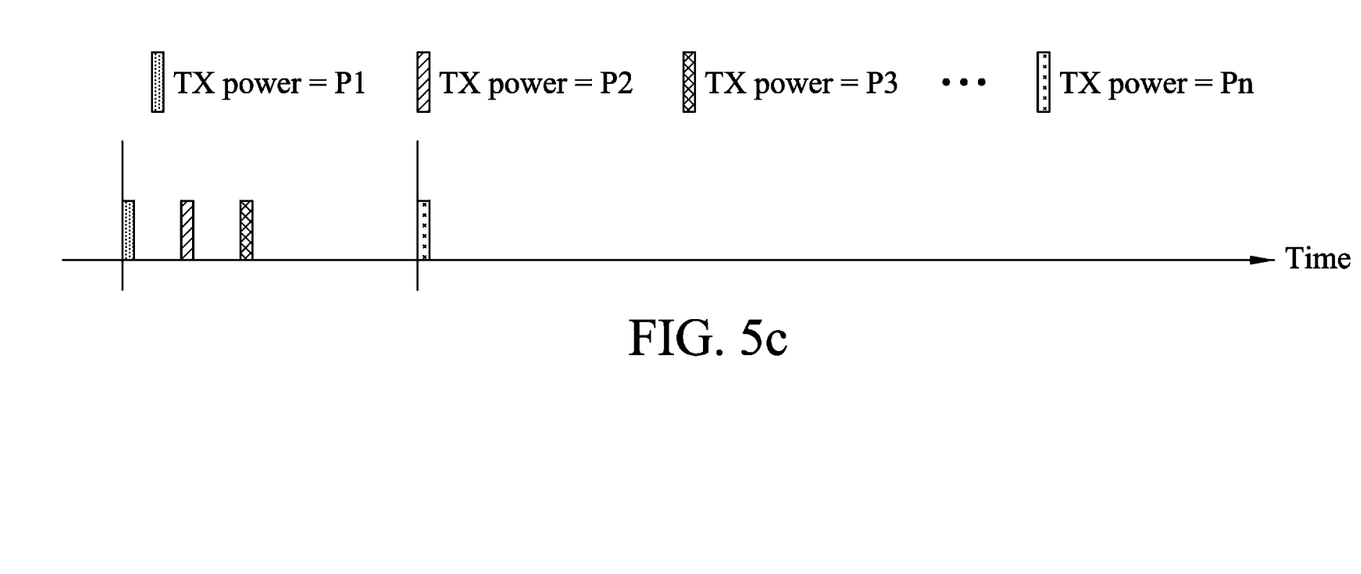
FIG. 5c shows an advertising packet transmitting schedule along a time axis according to yet another embodiment of the invention.

FIG. 5c shows an advertising packet transmitting schedule along a time axis according to yet another embodiment of the invention. In the embodiment, the radio module 302 may use different levels of transmission power to transmit different advertising packets. As shown in FIG. 5c, the transmission power P1 is used for transmitting the first advertising packet, the transmission power P2 is used for transmitting the second advertising packet, and the transmission power Pn is used for transmitting the n-th advertising packet. Note that the transmission power P1, P2, . . . Pn may be randomly adjusted, or adjusted in an ascending or descending manner, or other manner. The invention should not be limited to any specific adjusting algorithm.

Figure 6:
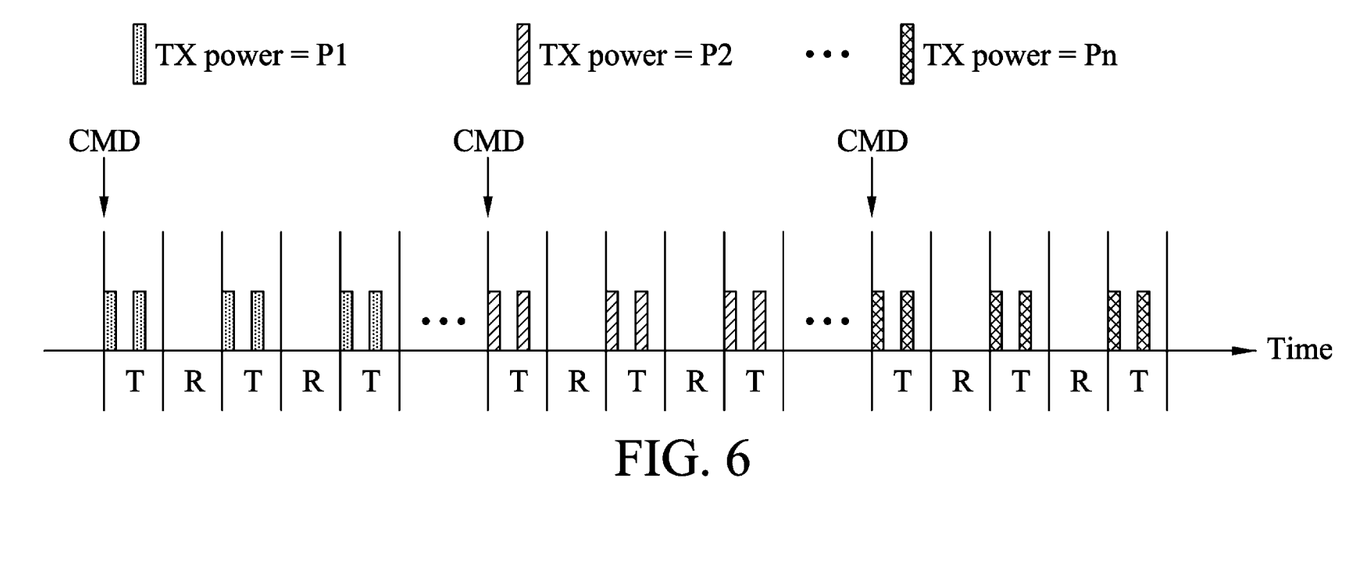
FIG. 6 shows an inquiry or paging ID packet transmitting and receiving schedule along a time axis according to yet another embodiment of the invention.

FIG. 6 shows an inquiry or paging packet transmitting and receiving schedule of a master device along a time axis according to yet another embodiment of the invention. In the embodiment, the radio module 302 may adjust the transmission power utilized for transmitting the packets by using different levels of transmission power to transmit the packets in response to different inquiry commands. According to an embodiment of the invention, a host may issue a plurality of HCI (Host Control Interface) inquiry commands. In response to each HCI_Inquiry command, one or more ID packets may be transmitted for a predefined time period or for a predefined rule. Therefore, as show in FIG. 6, in the embodiments, the transmission power P1 is used for transmitting the packets in response to a first inquiry command CMD, the transmission power P2 is used for transmitting the packets in response to a second inquiry command CMD, and the transmission power Pn is used for transmitting the packet in response to an n-th inquiry command CMD. Note that the transmission power P1, P2 . . . Pn may be randomly adjusted, or adjusted in an ascending or descending manner, or other manner. The invention should not be limited to any specific adjusting algorithm.

Referring back to FIG. 1 and FIG. 2, the controller 303 may further record the level of the transmission power utilized for transmitting a packet that have been received by the peer communications device (the controller 303 determines that the ID/advertisement packet has been successfully received by the peer communications device by checking whether a response packet is received from the peer communications device). For example, according to one embodiment of the invention, when one of the ID packets 110 with the transmission power P2 has been received by the peer communications device, the peer communications device may transmit the FHS packet 120 back to the communications apparatus 300 as shown in FIG. 1. In response to reception of the FHS packet 120, the controller 303 may further record the level of the transmission power P2 utilized for transmitting the received ID packet, and control the radio module 302 to use a transmission power, which is not less than the recorded transmission power P2, as the transmission power for transmitting the paging ID packet 130 to page the peer communications device.

According to another embodiment of the invention, when one of the paging ID packets 130 with the transmission power P2 has been received by the peer communications device, the peer communications device may transmit the ID packet(s) 140 back to the communications apparatus 300 as shown in FIG. 1. In response to reception of the ID packet(s) 140, the controller 303 may further record the level of the transmission power P2 utilized for transmitting the received ID packet, and control the radio module 302 to use a transmission power, which is not less than the recorded transmission power P2, as the transmission power for transmitting the FHS packet 150 and the initial transmission power for the new ACL connection with the peer communications device.

According to yet another embodiment of the invention, when one of the advertising packets ADV_IND with the transmission power P3 has been received by the peer communications device, the peer communications device may transmit the scan request packet SCAN_REQ back to the communications apparatus 300 as shown in FIG. 2a. In response to reception of the scan request packet SCAN_REQ, the controller 303 may further record the level of the transmission power P3 utilized for transmitting the received advertising packet ADV_IND, and control the radio module 302 to use a transmission power, which is not less than the recorded transmission power P3, as the transmission power for transmitting the scan response packet SCAN_RSP to respond to the peer communications device.

According to yet another embodiment of the invention, when one of the advertising packets ADV_IND with the transmission power P3 has been received by the peer communications device, the peer communications device may transmit the connection request packet CONNECT_REQ back to the communications apparatus 300 as shown in FIG. 2b. In response to reception of the connection request packet CONNECT_REQ, the controller 303 may further record the level of the transmission power P3 utilized for transmitting the received advertising packet ADV_IND, and control the radio module 302 to use a transmission power, which is not less than the recorded transmission power P3, as the transmission power for the new BLE connection with the peer communications device.

Note that according to some embodiments of the invention, there may be more than one transmission power recorded for a peer communications device, and the controller 303 may overwrite the recorded value(s). The controller 303 may determine to keep the latest recorded one, or keep the one with a smaller level, or make a determination according to another criterion. Note also that the period-based, slot-based, packet-based and command-based transmission power adjusting methods as illustrated above may be randomly used and switched in one procedure. In other words, the invention is not limited to use only one transmission power adjusting method in one procedure.

Figure 7:
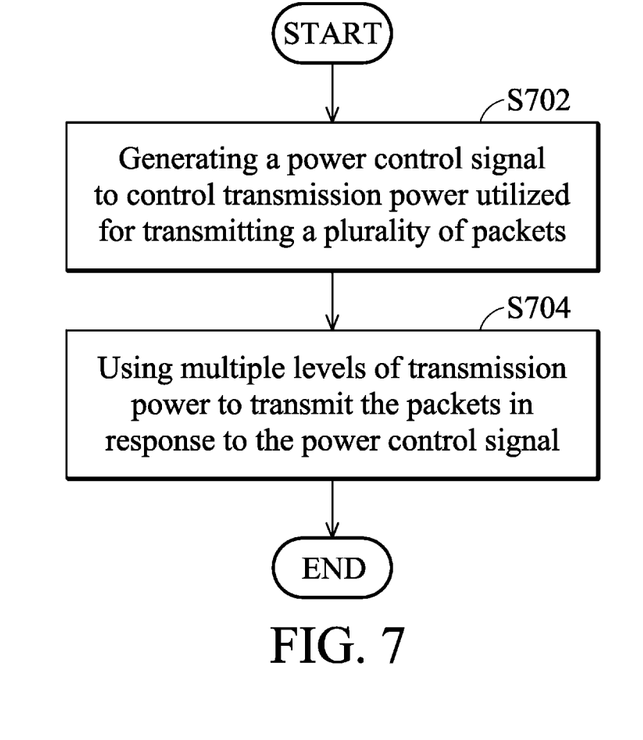
FIG. 7 shows a flow chart of a method for multi-level transmission power control of a communications apparatus according to an embodiment of the invention.

FIG. 7 shows a flow chart of a method for multi-level transmission power control of a communications apparatus according to an embodiment of the invention. Firstly, in step S702, a power control signal is generated to control transmission power utilized for transmitting a plurality of packets. In the embodiments of the invention, the packets are transmitted for searching for or paging a peer communications device or broadcasting advertisements of the communications apparatus. Next, in step S704, in response to the power control signal, multiple levels of transmission power are used to transmit the packets. Although Bluetooth/Bluetooth_LE system is introduced to describe the concepts of the present invention, it is not meant to be a limitation. The above-mentioned multi-level power control mechanisms are suitable for other wireless communications technologies, such as IEEE 802.11 protocol, for saving power during network searching and/or connection setup.

The above-described embodiments of the present invention can be implemented in numerous ways. For example, the embodiments may be implemented using hardware, firmware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a radio module transmitting a plurality of first packets in a Bluetooth network before establishing a connection with a peer communications device, wherein a transmission power utilized for transmitting the first packets in the Bluetooth network is adjustable, so that multiple levels of transmission power are utilized for transmitting the first packets in one procedure before establishing the connection with the peer communications device in the same Bluetooth network, wherein the first packets are transmitted in response to at least a first inquiry command and a second inquiry command; and
   a power amplifier utilizing a first transmission power to transmit the first packets in response to the first inquiry command and uses a second transmission power to transmit the first packets in response to the second inquiry command, wherein the first packets are identity packets transmitted in compliance with a Bluetooth protocol for establishing an Asynchronous Connection-Oriented Link (ACL) connection, wherein the first transmission power and the second transmission power have different levels, and wherein the radio module uses different levels of transmission power to transmit the first packets in different time slots.

2. The communications apparatus as claimed in claim 1, wherein the first packets are utilized to search for the peer communications device in the Bluetooth network or set up a connection with the peer communications device.

3. A communications apparatus, comprising:
   a radio module transmitting a plurality of first packets in a Bluetooth network before establishing a connection with a peer communications device, wherein a transmission power utilized for transmitting the first packets in the Bluetooth network is adjustable, so that multiple levels of transmission power are utilized for transmitting the first packets in one procedure before establishing the connection with the peer communications device in the same Bluetooth network, wherein the first packets are transmitted in response to at least a first inquiry command and a second inquiry command; and
   a power amplifier utilizing a first transmission power to transmit the first packets in response to the first inquiry command and uses a second transmission power to transmit the first packets in response to the second inquiry command, wherein the first packets are advertising packets transmitted in compliance with a Bluetooth low energy protocol for broadcasting or establishing a Bluetooth low energy connection, wherein the first transmission power and the second transmission power have different levels, and wherein the radio module uses different levels of transmission power to transmit the first packets in different time slots.

4. The communications apparatus as claimed in claim 1, wherein the radio module uses different levels of transmission power to transmit the first packets at different periods.

5. The communications apparatus as claimed in claim 1, wherein the radio module uses different levels of transmission power to transmit different first packets.

6. A method for multi-level transmission power control of a communications apparatus, comprising:
   generating a power control signal to control transmission power utilized for transmitting a plurality of first packets in a Bluetooth network;
   in response to the power control signal, using multiple levels of transmission power to transmit the first packets in a procedure, wherein the first packets are transmitted in the procedure for searching for or paging a peer communications device in the same Bluetooth network or broadcasting advertisements of the communications apparatus in the same Bluetooth network;
   receiving a second packet from the peer communications device after one of the first packets has been received by the peer communications device;
   recording the level of the transmission power utilized for transmitting the received first packet in response to reception of the second packet; and
   using a transmission power not less than the recorded transmission power as the transmission power for transmitting a following packet in the same Bluetooth network to the peer communications device,
   wherein the first packets are transmitted in response to at least a first inquiry command and a second inquiry command, and the step of using multiple levels of transmission power to transmit the first packets further comprises:
   using a first transmission power to transmit the first packets in response to the first inquiry command and using a second transmission power to transmit the first packets in response to the second inquiry command, wherein the first packets are identity packets transmitted in compliance with a Bluetooth protocol for establishing an Asynchronous Connection-Oriented Link (ACL) connection, wherein the first transmission power and the second transmission power have different levels, and wherein using multiple levels of transmission power to transmit the first packets further comprises using different levels of transmission power to transmit the first packets in different time slots.

7. The method as claimed in claim 6, wherein the step of using multiple levels of transmission power to transmit the first packets further comprises:
  using different levels of transmission power to transmit the first packets at different periods.

8. The method as claimed in claim 6, wherein the step of using multiple levels of transmission power to transmit the first packets further comprises:
  using different levels of transmission power to transmit different first packets.

9. The method as claimed in claim 6, wherein when the first packets are transmitted for paging the peer communications device or broadcasting the advertisement of the communications apparatus, the following packet is transmitted to the peer communications device to establish a connection and the recorded transmission power is further used to be the initial transmission power of the connection.

10. The method as claimed in claim 6, wherein when the first packets are transmitted for searching the peer communications device, the following packet is a Frequency Hop Synchronization (FHS) packet and the recorded transmission power is further used for paging the peer communications device.

11. A method for multi-level transmission power control of a
  communications apparatus, comprising:
    generating a power control signal to control transmission power utilized for transmitting a plurality of first packets in a Bluetooth network;
    in response to the power control signal, using multiple levels of transmission power to transmit the first packets in a procedure, wherein the first packets are transmitted in the procedure for searching for or paging a peer communications device in the same Bluetooth network or broadcasting advertisements of the communications apparatus in the same Bluetooth network;
  receiving a second packet from the peer communications device after one of the first packets has been received by the peer communications device;
  recording the level of the transmission power utilized for transmitting the received first packet in response to reception of the second packet; and
  using a transmission power not less than the recorded transmission power as the transmission power for transmitting a following packet in the same Bluetooth network to the peer communications device,
  wherein the first packets are transmitted in response to at least a first inquiry command and a second inquiry command, and the step of using multiple levels of transmission power to transmit the first packets further comprises:
  using a first transmission power to transmit the first packets in response to the first inquiry command and using a second transmission power to transmit the first packets in response to the second inquiry command, wherein the first packets are advertising packets transmitted in compliance with a Bluetooth low energy protocol for broadcasting or establishing a Bluetooth low energy connection, wherein the first transmission power and the second transmission power have different levels, wherein the first transmission power and the second transmission power have different levels, and wherein using multiple levels of transmission power to transmit the first packets further comprises using different levels of transmission power to transmit the first packets in different time slots.

* * * * *